(12) United States Patent
Bonnard

(10) Patent No.: US 8,272,779 B2
(45) Date of Patent: Sep. 25, 2012

(54) CALORIMETER

(76) Inventor: John Anthony Bonnard, Pretoria (ZA)

( * ) Notice: Subject to any disclaimer, the term of this patent is extended or adjusted under 35 U.S.C. 154(b) by 148 days.

(21) Appl. No.: 12/789,662

(22) Filed: May 28, 2010

(65) Prior Publication Data

US 2010/0303125 A1 Dec. 2, 2010

(30) Foreign Application Priority Data

May 29, 2009 (ZA) .................................. 2009/03734

(51) Int. Cl.
*G01N 25/22* (2006.01)
*G01K 17/00* (2006.01)

(52) U.S. Cl. ................ 374/36; 374/31; 374/32; 374/33; 374/38

(58) Field of Classification Search ............... 374/36, 374/31, 32, 33, 38
See application file for complete search history.

(56) References Cited

U.S. PATENT DOCUMENTS

| | | | | |
|---|---|---|---|---|
| 3,718,437 A | * | 2/1973 | Paloniemi | 422/51 |
| 4,208,907 A | * | 6/1980 | Townsend et al. | 374/34 |
| 4,670,404 A | * | 6/1987 | Swift et al. | 436/147 |
| 5,547,282 A | * | 8/1996 | Pinhack et al. | 374/36 |
| 5,588,746 A | * | 12/1996 | Minobe et al. | 374/10 |
| 2003/0012251 A1 | * | 1/2003 | Bonnard | 374/1 |
| 2009/0310646 A1 | * | 12/2009 | Schenker | 374/31 |
| 2010/0316087 A1 | * | 12/2010 | Pinhack | 374/33 |

* cited by examiner

*Primary Examiner* — Lisa Caputo
*Assistant Examiner* — Jamel Williams
(74) *Attorney, Agent, or Firm* — Wenderoth, Lind & Ponack, LLP

(57) ABSTRACT

A calorimeter which includes a casing in which a sample is combusted, a jacket around the casing, and temperature sensors in an outer surface of the jacket.

11 Claims, 2 Drawing Sheets

CALORIMETER

BACKGROUND OF THE INVENTION

This invention relates to a calorimeter.

A typical calorimeter includes a combustion vessel, also referred to as a bomb, in which a sample of a material is combusted, usually in a high pressure oxygen environment, to obtain data on the calorific characteristics of the material. The bomb may be immersed in a circulating liquid, e.g. water, and measurements of an increase in temperature of the liquid, resulting from combustion of the sample, are used to calculate the calorific value of the material.

Different materials combust in different ways depending for example on the presence or absence of inflammable volatile constituents. It is at least for this reason that a water-immersion calorimeter has found favor for the heat from the sample is totally absorbed in the water irrespective of the shape of a flame generated by the combusting material.

The use of a manually operated, water-immersion calorimeter is labor intensive for the quantity of water in which the bomb is immersed must be accurately dispensed for each test. Automated calorimeters have been developed to address this aspect. Although successful, such calorimeters are of complex construction and thus expensive.

One type of dry calorimeter which has been developed to eliminate the use of water includes a heat-conductive jacket which surrounds the combustion vessel and temperature sensors positioned at an interface between the jacket and the combustion vessel. Despite the heat dispersive effect of the conductive jacket it is possible for this type of calorimeter to produce deviant results for varying flame patterns, which are produced by combusting samples of materials with different properties, can result in temperature changes which are manifested differently in various parts of the bomb. The measurements of such temperatures are then dependent on the physical positions of the sensors.

High internal pressures are generated inside a bomb upon combustion of a sample. If an attempt is made to remove a lid of the bomb before the internal pressure is reduced the force which is exerted on the lid by the pressurized gas can violently project the lid from the bomb with the possibility of serious injury to an operator.

It is an object of the present invention to provide a calorimeter which, at least partly, addresses the aforementioned aspects.

SUMMARY OF INVENTION

The invention provides a calorimeter which includes a body with a casing with an outer casing surface, and an inner casing surface which defines, at least partly, a volume, a jacket, made from a heat conductive material, which is engaged with the casing and which has an inner jacket surface engaged with at least part of the outer casing surface, and an outer jacket surface, an access opening to the volume, a closure which is removably engageable with the opening to seal the volume, and a temperature sensing arrangement located at least partly in the jacket outer surface.

A crucible, in which a sample is combustible, may be positioned inside the volume depending from the closure.

At least part of the jacket inner surface may be in direct physical contact with an opposing part of the casing outer surface.

A housing of a suitable material, for example stainless steel, may surround at least part of the jacket outer surface.

The temperature sensing arrangement may comprise a plurality of temperature sensors. The sensors may be positioned inside respective formations which are formed in the outer casing surface. The temperature sensors may be positioned at spaced intervals in a first array which extends in a circumferential sense around the casing. Preferably the temperature sensors are also positioned at spaced intervals in a second array which extends in a circumferential sense around the casing. The first array of sensors may be near one end of the casing, for example close to the access opening, and the second array of sensors may be near an opposing end of the casing, for example near a base of the casing. This type of spacing ensures that temperature variations over the area of the casing are accurately detected.

The calorimeter may include a heat reflector between the crucible and the closure. The reflector may be shaped to reflect heat towards the inner casing surface. The reflector may for example be of a conical shape.

At least a periphery of the reflector may be in heat-conducting engagement with the casing. This helps to direct heat from the reflector into the casing. A support for the crucible may extend through the reflector.

The casing may include a castellated undercut rim, adjacent the access opening, and the closure may be of complementary shape and include a plurality of projections which are respectively engageable with undercut projections of the rim when the closure is engaged with the body. Such engagements may be effected by twisting the closure relative to the body.

The invention also extends to a calorimeter which includes a body with a volume in which, in use, a sample is combusted, an access opening to the volume, a closure which is engageable with the access opening, a gas flow passage to the volume and a locking mechanism which is movable from a first position at which the closure is removable from the opening, to a second position at which the closure is not removable and at which gas can flow to or from the volume through the passage, and to a third position at which the closure is not removable from the access opening and at which gas flow through the passage is prevented.

The locking mechanism may be of any suitable shape and size and, for example, may include an elongate member which is movable from a first bore in the body into engagement with a second bore, in the closure, which is in register with the first bore.

The gas passage may traverse the second bore.

BRIEF DESCRIPTION OF THE DRAWINGS

The invention is further described by way of example with reference to the accompanying drawings in which.

DESCRIPTION OF PREFERRED EMBODIMENT

Figure 1:
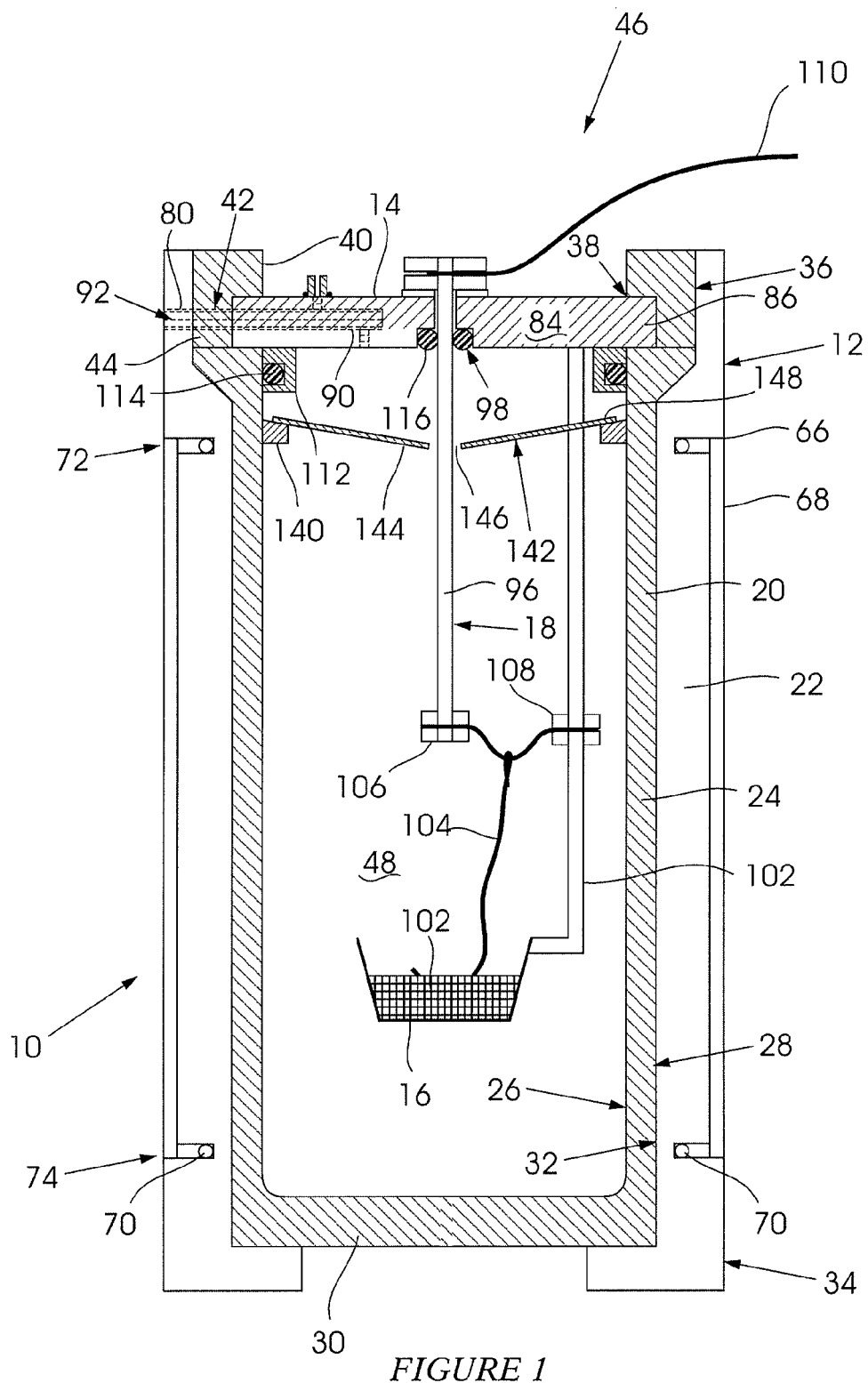
FIG. 1 is a side view in section of a calorimeter according to the invention.

FIG. 1 of the accompanying drawings is a side view in cross-section of a calorimeter bomb 10 according to the invention. The calorimeter includes a body 12, a closure 14, a crucible 16 and sample ignition and support structure 18.

The body 12 includes an inner casing 20 which is made from a suitable material such as stainless steel and a jacket 22 which is made from a highly heat-conductive material such as copper or aluminium.

The casing 20 has a cylindrical side wall 24 with an inner surface 26 and an outer surface 28, and a base 30. The jacket 22 has an inner jacket surface 32 and an outer jacket surface 34. It is desirable to have close contact between the casing and the jacket and, for this reason, the jacket is preferably heat shrunk onto the casing to ensure that an intimate bond exists between these two parts.

The inner casing has an upper rim 36 with an undercut formation 38 with an overlying set of castellated projections 40. A first bore 42 is formed in a radial sense through a wall portion 44 of the rim into one of the undercut formations.

The rim defines an access opening 46 to a volume 48 which is enclosed by the casing. The base 30 opposes the access opening.

A number of recessed formations 66, linked by axially extending slots 68, are formed in the outer jacket surface 34. Temperature sensors 70 are positioned in the formations 66. The sensors are arranged in a first or upper array 72 which is close to the access opening. The sensors extend at spaced intervals in a circumferential sense around the jacket. A second array 74 of the sensors is located near the base 30. The sensors are similarly spaced from each other i.e. circumferentially separated around the jacket.

Electrical leads, not shown, positioned inside the slots 68, connect the sensors to each other in a manner which is known in the art. These leads extend to external measuring equipment, not shown, used to monitor and record temperature values produced by the sensors.

A bore 80 through an upper portion of the jacket is in direct register with the first bore 42.

The closure 14 includes a nominally circular lid 84 with peripherally extending projections 86 which are of complementary shape to the undercut castellated formations on the rim 36. If the closure is correctly positioned on the rim the projections 86 can pass between adjacent projections 40 on the rim and move to rest on respective lower surfaces of the undercut formations 38, as shown in FIG. 1. If the closure is then rotated through a small angle the projections 86 become locked under the undercut formations 38 and in this way the closure is firmly secured to the body with a bayonet-type action.

A second bore 90 extends into the lid in a radial sense. A locking pin 92 is engagable with the bores 80, 42 and 90—an aspect which is further described hereinafter with reference particularly to FIGS. 2, 3 and 4.

The structure 18 includes an elongate rod 96 which extends downwardly from a centrally positioned hole 98 in the lid. Supporting structure 102 for the crucible 16 also extends downwardly from the lid. An igniter element 104 such as a length of cotton is connectable between conductive contacts 106 and 108 on the rod 96 and on the structure 102 respectively, as is known in the art. An electrical ignition lead 110, connected to an upper end of the structure 18, is used to ignite the element 104 when required. This aspect is known in the art and is not described herein.

The closure has an inner rim 112 which carries a gas seal 114 in the form of an O-ring which provides an effective seal once the closure is engaged with the castellated rim. A gas seal 116, also in the form of an O-ring, tightly surrounds the rod 96 at the opening 98 and seals the interface between the structure and the surrounding surface of the lid.

The crucible 16, in use, contains a sample 120 which is combusted inside the volume 48 so that measurements of its calorific value can be determined.

Figure 2:
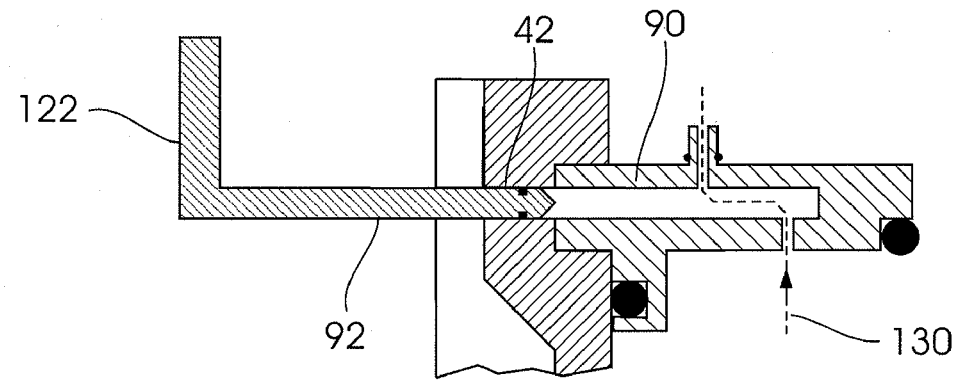
FIGS. 2, 3 and 4 are cross-sectional side views of an upper part of the calorimeter shown in FIG. 1, in different stages of usage.
Figure 3:
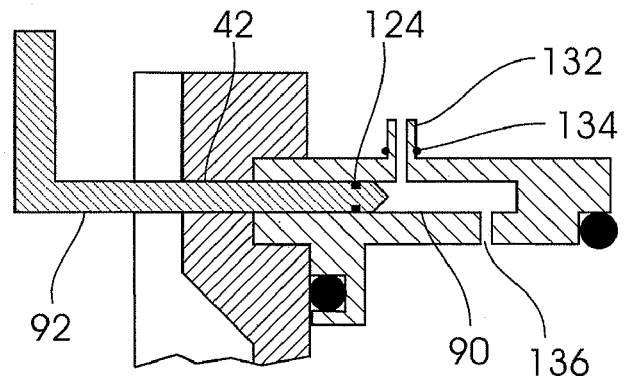
Figure 4:
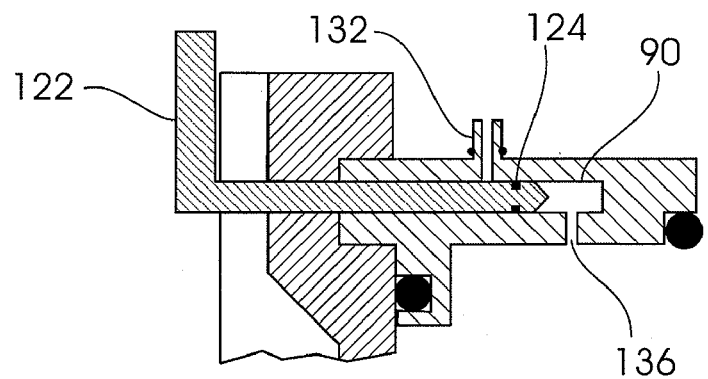

FIGS. 2 to 4 illustrate in cross-section an upper portion of the calorimeter and show how the locking pin 92 is used to lock the closure to the body. The pin includes a small handle 122 which allows an operator to manipulate the pin. At a leading end the pin has a small gas seal 124 in the form of an O-ring which is in sliding contact with an inner surface of the bore 42 and of the bore 90 as the pin is moved to and fro by an operator.

A gas passage 130 traverses the bore 90. The passage is formed by an oxygen supply inlet spigot 132, which is upstanding on an upper surface of the lid and which has an externally mounted O-ring seal 134, and a small passage 136 between the bore 90 and a lower surface of the lid.

On the inner surface 26, close to the access opening, the casing has a small ledge 140 which projects inwardly (FIG. 1). A heat reflective plate 142, of slight conical shape, is engaged with the ledge. The plate has a lower heat-reflective surface 144, and a central aperture 146 though which the rod 96 passes. A peripheral edge 148 of the plate rests in heat-engaging contact with the ledge 140.

With the locking pin in the position shown in FIG. 2 the closure is lowered onto the rim and engaged therewith, with a twisting action, in the manner which has been described. Thereafter the pin is moved to the position shown in FIG. 3 in that the leading end of the pin enters the bore 90 and the gas seal 124 is sealingly engaged with the bore. However the pin does not extend sufficiently far into the bore 90 to block communication between the inlet spigot 132 and the passage 136. The location of this intermediate position is determined by means of a slotted gating block, which has been omitted for clarity of illustration. An oxygen supply, not shown, is then connected to the spigot 132 and the volume 48 of the calorimeter is pressurized to the required extent, generally on the order of 30 bar.

The locking pin is then moved to the position shown in FIG. 4. At this point the seal 124 is sealingly engaged with the bore 90 at a location which is between the spigot and the passage 136. The interior of the calorimeter is thus isolated from atmosphere. The oxygen supply is then disconnected from the spigot and the calorimeter is loaded into additional structure, not shown, for example in the nature of an insulated polystyrene block or a thermostat-controlled outer jacket structure.

The temperature sensors 70 are monitored by external control equipment to track the temperature of the calorimeter, until the temperature reaches a constant value or a constant rate of change, depending on the protocol which is being followed. These aspects are known in the art and although important to the working of the calorimeter are not required for an understanding of the inventive principles to which this application relates. An initial temperature of the calorimeter is recorded. Thereafter an electrical current is passed through the lead 110 in order to ignite the element 104. The sample 120 in the oxygen-rich atmosphere inside the volume is ignited and combusted.

The rise in temperature produced by ignition of the sample is monitored until the temperature reaches a constant value or a constant rate of change, at which time a final temperature measurement is made. The temperature increase is employed using known processes to calculate the calorific value of the material under test.

The calorimeter bomb 10 is then removed from the supporting structure and the locking pin is moved to the FIG. 2 position. As the pin passes through the FIG. 3 position the pressurized volume 48 is connected to atmosphere and the high pressure gas inside the volume can escape to atmosphere. The closure is however kept securely in position. The volume is thus depressurized. With the pin in the FIG. 2 position the closure can be removed from the body 12. Thereafter the calorimeter is cooled, preferably inverted on a water fountain, and is again ready for use.

During the combustion process heat which is radiated upwardly from the sample inside the volume 48 is reflected downwardly by the reflector plate but in a direction which causes the reflected heat to impinge on the inner surface 26. This heat is therefore more readily absorbed by the side wall 24 and very little heat reaches the closure. Heat which is absorbed by the reflector plate is mainly conducted to the casing and jacket because of the conductive interengagement of the rim 148 with the ledge 140.

The calorimeter offers two significant additional benefits. Firstly, the temperature sensors are on an outer side of the jacket 22 which is highly thermally conductive. Thus thermal energy reaching the jacket is conducted through the jacket, substantially evenly, before the heat reaches the sensors. The sensor readings are, it is believed, thus more accurate than what is the case when the sensors are positioned at an interface between the jacket and the casing. Secondly, due to the interlocking capability of the locking pin which is used to couple the closure to the body, it is not possible for the volume 48 to be pressurized if the pin is not correctly used. Correct use of the pin, in turn, means that when the volume is pressurized the lid is locked to the body and, conversely, when the pin is moved to a release position an escape path is provided for the high pressure gas inside the volume so that pressure inside the volume can be safely reduced before the closure is detached from the body.

The invention claimed is:

1. A calorimeter comprising:
a body including a casing with an outer casing surface, and an inner casing surface which defines, at least partly, a volume, a jacket, made from a heat conductive material, which is engaged with the casing and which has an inner jacket surface engaged with at least part of the outer casing surface, and an outer jacket surface, and an access opening to the volume;
a closure which is removably engageable with the opening to seal the volume;
a temperature sensing arrangement located at least partly in the jacket outer surface;
a crucible, in which a sample is combustible, positioned inside the volume and depending from the closure; and
a heat reflector between the crucible and the closure which is shaped to reflect heat towards the inner casing surface.

2. A calorimeter according to claim 1, wherein the temperature sensing arrangement comprises a plurality of temperature sensors which are positioned inside respective formations which are formed in the jacket.

3. A calorimeter according to claim 1, wherein at least a periphery of the reflector is in heat-conducting engagement with the casing and a support for the crucible extends through the reflector.

4. A calorimeter according to claim 1 wherein the casing includes a castellated undercut rim, adjacent the access opening, and the closure is of complementary shape and includes a plurality of projections which are respectively engageable with undercut projections of the rim when the closure is engaged with the body.

5. A calorimeter which includes a body with a volume in which, in use, a sample is combusted, an access opening to the volume, a closure which is engageable with the access opening, a gas flow passage to the volume and a locking mechanism which is movable from a first position at which the closure is removable from the opening, to a second position at which the closure is not removable and at which gas can flow to or from the volume through the passage, and to a third position at which the closure is not removable from the access opening and at which gas flow through the passage is prevented.

6. A calorimeter according to claim 5, wherein the locking mechanism comprises an elongate member which is movable from a first bore in the body into engagement with a second bore, in the closure, which is in register with the first bore.

7. A calorimeter according to claim 6 wherein the gas passage traverses the second bore.

8. A calorimeter comprising:
a body including a casing having an outer casing surface and an inner casing surface, a jacket engaged with at least part of the outer casing surface and made from a material which is more thermally conductive than a material forming the casing, and an access opening to a volume defined, at least in part, by the inner casing surface,
wherein the jacket has an outer jacket surface and an inner jacket surface which is intimately bonded to the outer casing surface;
a closure removably engageable with the opening to seal the volume; and
a plurality of temperature sensors which are positioned inside respective formations in the jacket.

9. A calorimeter according to claim 8, further including a crucible, in which a sample is combustible, positioned inside the volume depending from the closure, and a heat reflector between the crucible and the closure, wherein the heat reflector is shaped to reflect heat towards the inner casing surface.

10. A calorimeter according to claim 9, wherein at least a periphery of the reflector is in heat-conducting engagement with the casing and a support for the crucible extends through the reflector.

11. A calorimeter according to claim 8, wherein the casing includes a castellated undercut rim, adjacent the access opening, and the closure is of complementary shape and includes a plurality of projections which are respectively engageable with undercut projections of the rim when the closure is engaged with the body.

* * * * *